(12) United States Patent
Rauschert (10) Patent No.: US 9,475,432 B1
(45) Date of Patent: Oct. 25, 2016

(54) MOTOR VEHICLE ACCESSORY (71) Applicant: Steinjager, Inc., Bushnell, IL (US)

(72) Inventor: Mark C. Rauschert, Bushnell, IL (US)

(73) Assignee: Steinjager, Inc., Bushnell, IL (US)

( * ) Notice: Subject to any disclaimer, the term of this patent is extended or adjusted under 35 U.S.C. 154(b) by 0 days.

(21) Appl. No.: 14/852,691

(22) Filed: Sep. 14, 2015

(51) Int. Cl.
*B60R 11/00* (2006.01)
*B60R 3/00* (2006.01)
*B60R 1/078* (2006.01)

(52) U.S. Cl.
CPC ............ *B60R 11/00* (2013.01); *B60R 1/078* (2013.01); *B60R 3/007* (2013.01); *B60R 2011/004* (2013.01); *B60R 2011/005* (2013.01)

(58) Field of Classification Search
CPC ....... B60R 1/078; B60R 11/00; B60R 3/007; B60R 2011/005; B60R 2011/004
See application file for complete search history.

(56) References Cited

U.S. PATENT DOCUMENTS

| | | | |
|---|---|---|---|
| 5,490,306 A * | 2/1996 | Floyd | E05D 11/0054 16/250 |
| 5,516,073 A * | 5/1996 | McMahan | B60R 1/06 248/289.11 |
| 5,799,849 A * | 9/1998 | Beer | B60R 11/00 224/282 |
| D445,743 S * | 7/2001 | Hsu | D12/187 |
| 7,267,384 B1 * | 9/2007 | Coviello | B60R 1/078 296/1.11 |
| 7,980,345 B1 | 7/2011 | Harvey | |

* cited by examiner

*Primary Examiner* — Frank Vanaman
(74) *Attorney, Agent, or Firm* — Philip L. Bateman (57) ABSTRACT A motor vehicle accessory mounts temporarily to a motor vehicle door hinge. The integral mount of the accessory includes a metal sleeve lined with a non-scratching non-metallic material.

2 Claims, 8 Drawing Sheets

MOTOR VEHICLE ACCESSORY

FIELD OF THE INVENTION

This invention relates to motor vehicles. More particularly, this invention relates to foot rests, mirrors, and other accessories for motor vehicles.

BACKGROUND OF THE INVENTION

Motor vehicles such as the Jeep Wrangler are often driven off road for sport and fun. The term "motor vehicle" is used herein to include any type of motor vehicle, including automobiles, trucks, all terrain vehicles (ATVs), utility task vehicles (UTVs), dune buggies, and the like. When driven off road, the doors of the vehicle are sometimes removed. Foot rests that mount on the lower door hinge, mirrors that mount on the upper door hinge, and other hinge-mounted accessories are sometimes added for fun and function.

The foot rests and mirrors mount on the hinges in one of two ways. Some contain a post that is inserted into the interior of the hinge. These accessories tend to wobble. Other accessories contain sleeves that mount over the hinge. These accessories tend to scratch the paint on the hinges.

Harvey, U.S. Pat. No. 7,980,345, Jul. 19, 2013, discloses a foot rest that is connected to a rod having two posts, one that fits into the lower door hinge and one that fits into the upper door hinge. A mirror is optionally included. The Harvey accessory is more secure because of its two attachment points, but is large and cumbersome.

Accordingly, there is a demand for an improved motor vehicle accessory for mounting on a door hinge. More particularly, there is a demand for a motor vehicle accessory that mounts securely to a door hinge without scratching the exterior of the hinge.

SUMMARY OF THE INVENTION

The general object of this invention is to provide an improved motor vehicle accessory for mounting on a door hinge. A more particular object is to provide a motor vehicle accessory that mounts securely to a door hinge without scratching the exterior of the hinge.

I have invented a motor vehicle accessory for temporary mounting on a motor vehicle door hinge. The accessory has an integral mount comprising a metal sleeve with an interior lined with a non-scratching non-metallic material. The sleeve is adapted to fit over a motor vehicle door hinge.

The motor vehicle accessory of this invention make a very secure mount to the motor vehicle hinge, but leaves no scratches on the outside surface of the hinge.

DETAILED DESCRIPTION OF THE INVENTION

1. The First Preferred Embodiment

Figure 1:
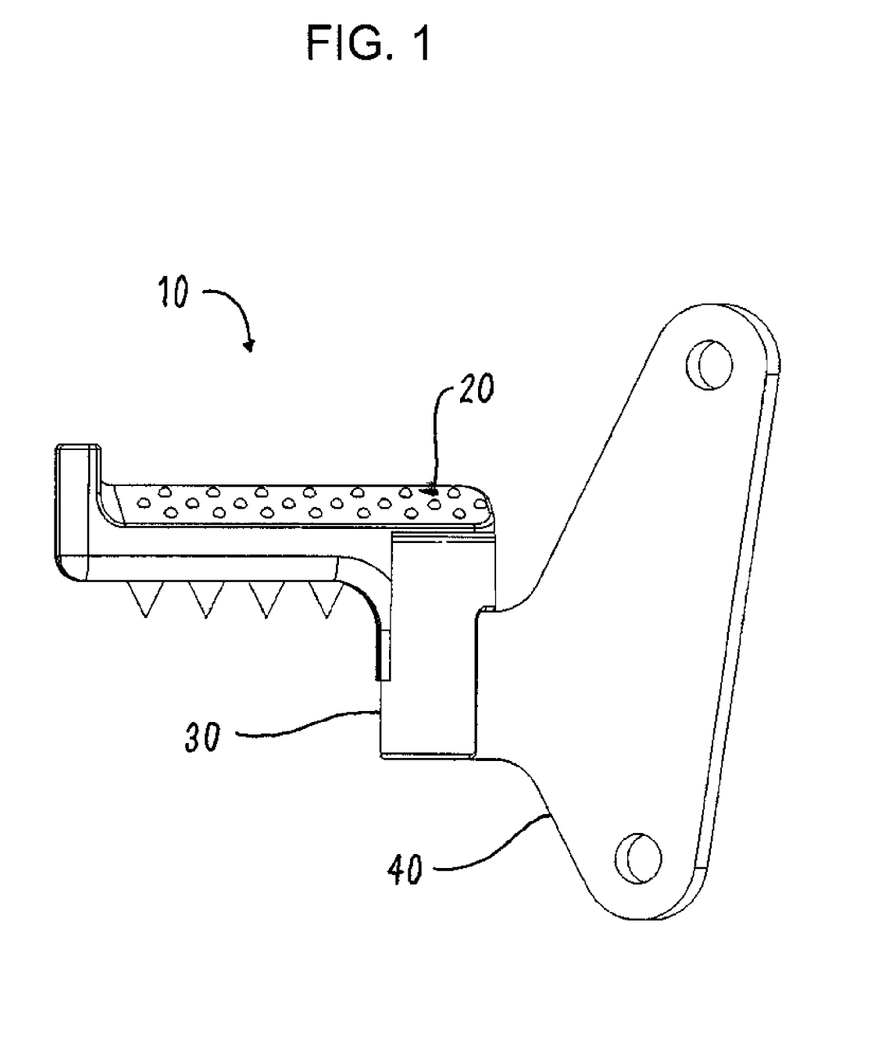
FIG. 1 is a perspective view of a first embodiment of the motor vehicle accessory of the invention.
Figure 2:
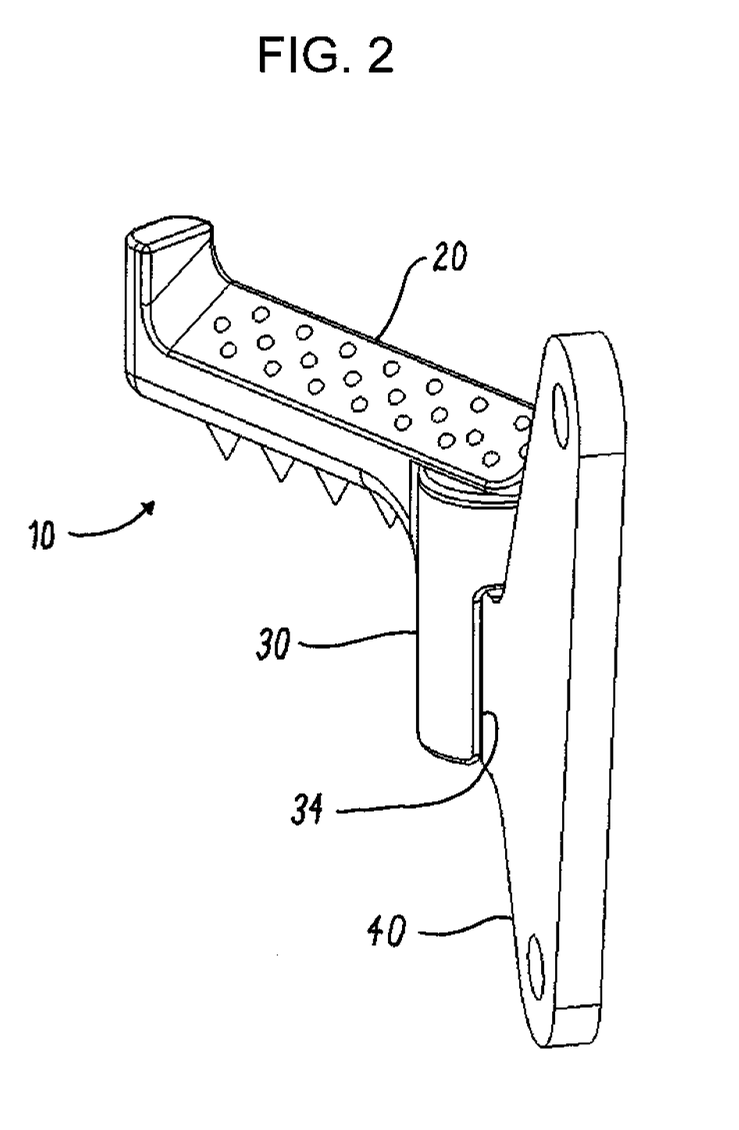
FIG. 2 is a perspective thereof from a different perspective.

This invention is best understood by reference to the drawings. Referring first to FIGS. 1 and 2, a first preferred embodiment of the motor vehicle accessory of this invention is a foot rest 10. The foot rest consists of a foot rest portion 20 and an integral mount 30. The foot rest is temporarily mounted onto a hinge 40 that is part of a motor vehicle from which a door has been removed. The foot rest is discussed in more detail below.

2. The Foot Rest Portion

The foot rest portion is adapted to be a comfortable structure for the driver or passenger to rest the outward facing foot. The size and shape of the foot rest portion is a matter of choice. The foot rest portion preferably has a length of about four to six inches and a width of about one to two inches. The upper surface of the foot rest portion preferably contains a plurality of projections for improved traction. The upper surface of the foot rest portion is preferably angled rearwardly so that the foot of the driver or passenger makes a comfortable and full contact.

The foot rest is made of a durable material, preferably metal, and most preferably steel. The foot rest portion of the first preferred embodiment is made of a steel core with a molded surface of a non-slip material. Suitable non-slip materials include thermoplastics, rubbers, and the like. Preferred non-slip materials are thermoplastics. The most preferred non-slip material is polyurethane because of its superior physical properties of moldability, durability, and traction.

3. The Integral Mount

Figure 3:
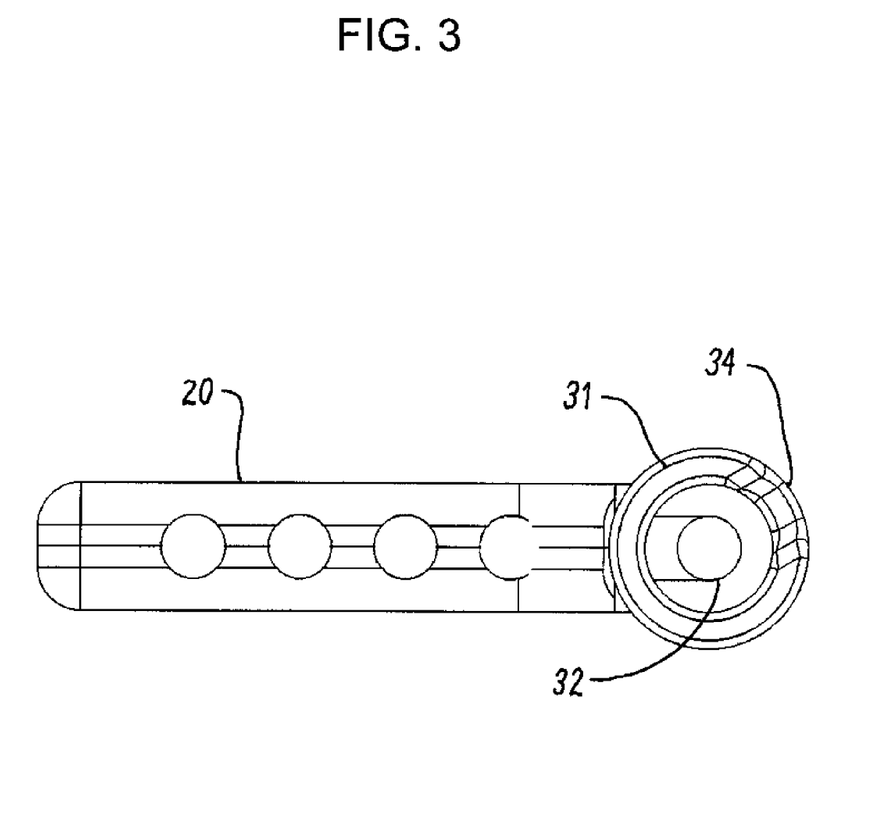
FIG. 3 is a bottom plan view thereof.
Figure 4:
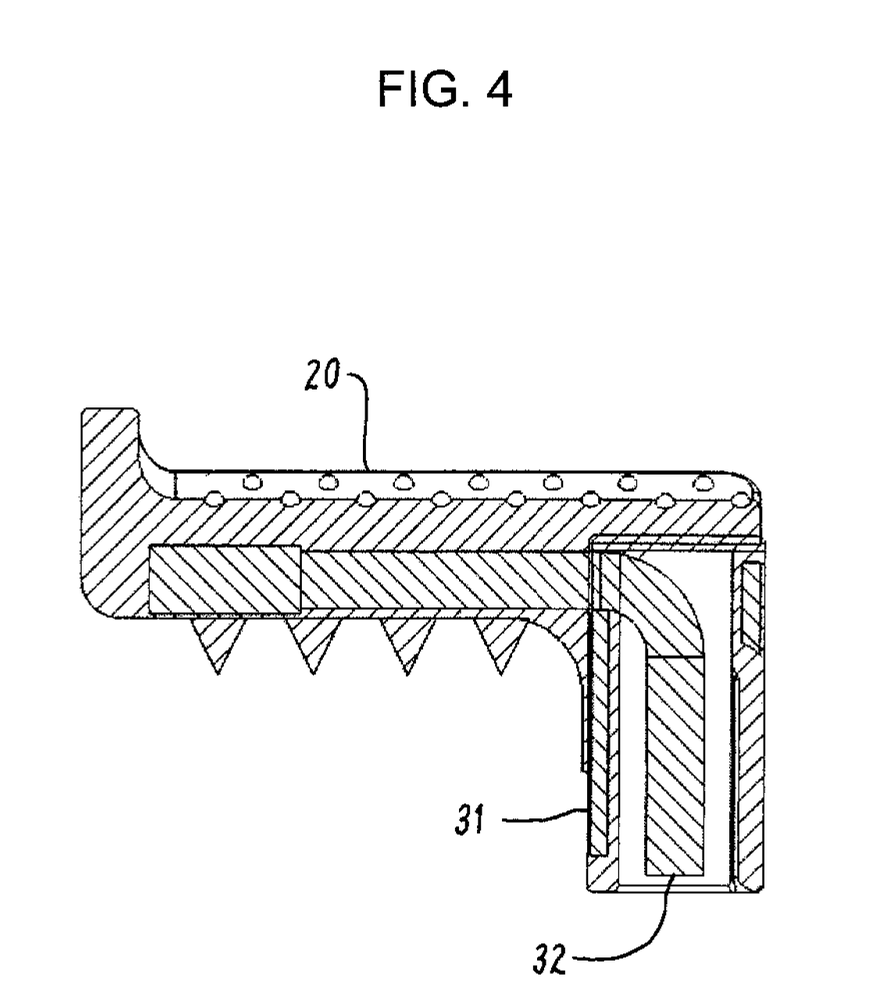
FIG. 4 is a side elevation sectional view thereof.
Figure 5:
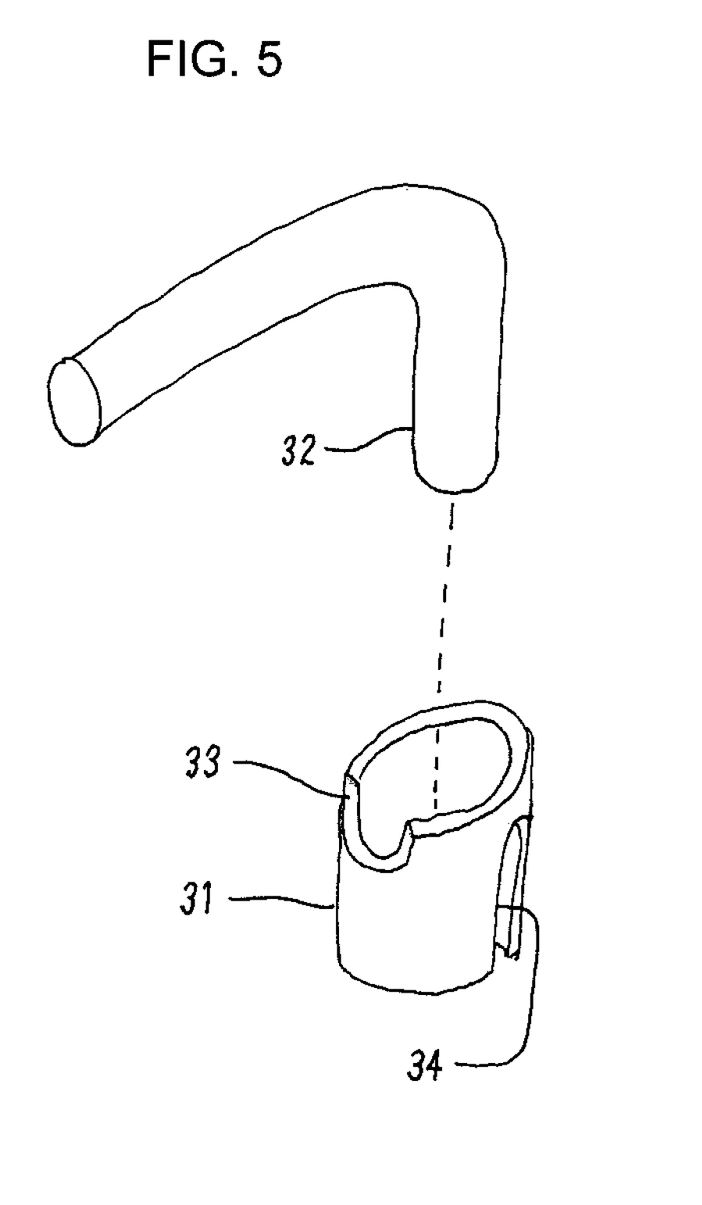
FIG. 5 is an exploded view of a first step in the manufacture thereof.

Integral with the foot rest is a mount 30 for temporary mounting onto a motor vehicle hinge. Referring now to FIGS. 3 and 4, the mount is preferably an integral metal sleeve 31 with a coaxial metal post 32. The metal sleeve fits over the hinge and the post fits inside the hinge to provide a very secure fit. The top of the mount is closed and the bottom of the mount is open. The sleeve of the mount is preferably attached to the core of the foot rest. As best seen in FIG. 5, the first preferred embodiment is manufactured by welding a steel rod with a 90 degree bend onto a steel sleeve with a semi-circular recess 33 in the upper edge that conforms to the shape of the rod. The rod thus serves as both the steel core of the foot rest portion and the post of the mount portion. The post and the sleeve are coaxial (have the same axis) and create an annular space for the hinge. The sleeve contains an indent 34 in the lower edge that enables it to straddle the hinge.

The interior and exterior of the sleeve are preferably covered with a non-scratching non-metallic surface. Suitable non-scratching materials include thermoplastics, rubbers, fiberglass, carbon fiber, and the like. The preferred materials are thermoplastics such as polyurethanes, polyvinyl chloride (PVC), polyethylene, polypropylene, polyamides, polycarbonates, acrylonitrile butadiene styrene (ABS), polystyrene and the like. The preferred thermoplastic is polyurethane because of its physical properties. The thermoplastic is affixed to the metal sleeve by a conventional molding, coating, or dipping process. The exterior of the rod is preferably not covered with a thermoplastic surface.

4. Use

The motor vehicle accessory of this invention is used by first removing a door from a motor vehicle and then temporarily mounting the accessory onto the hinge. The combination of the sleeve enveloping the outer part of the hinge and the post inside the hinge provides a very secure and stable mounting. The non-scratching surface on the interior of the sleeve prevents any scratching of the exterior surface of the hinge.

5. Alternate Embodiments

Figure 6:
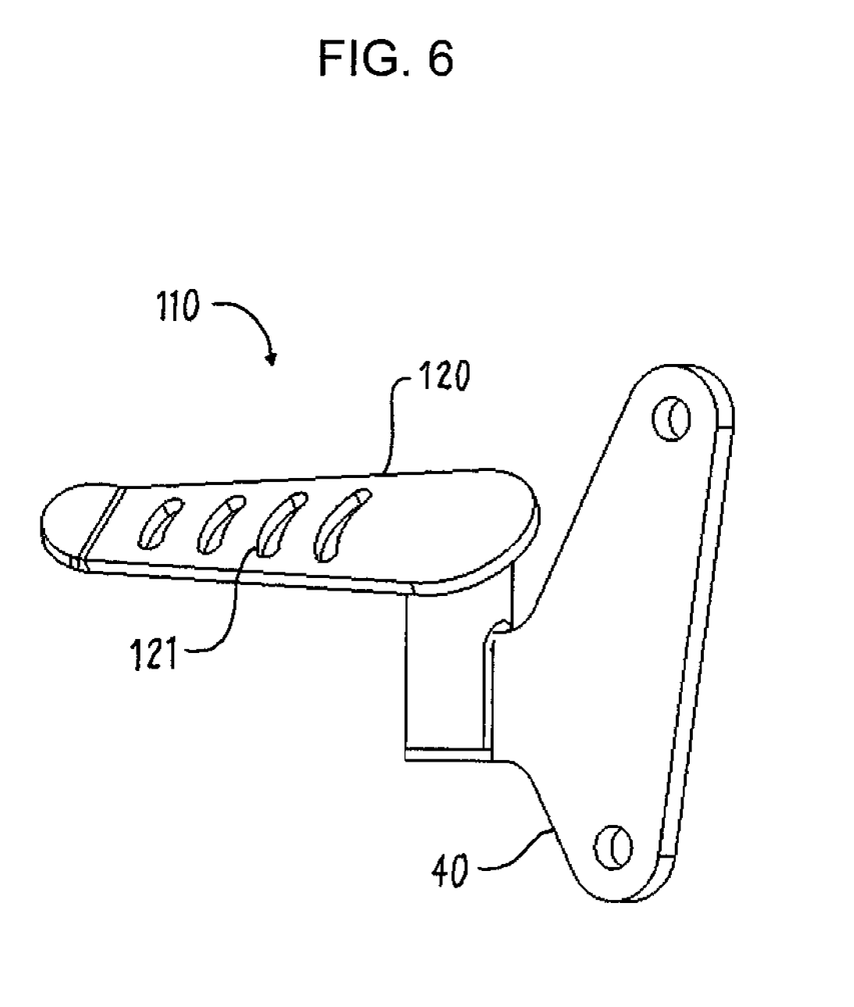
FIG. 6 is a perspective view of a second embodiment of the motor vehicle accessory of the invention.
Figure 7:
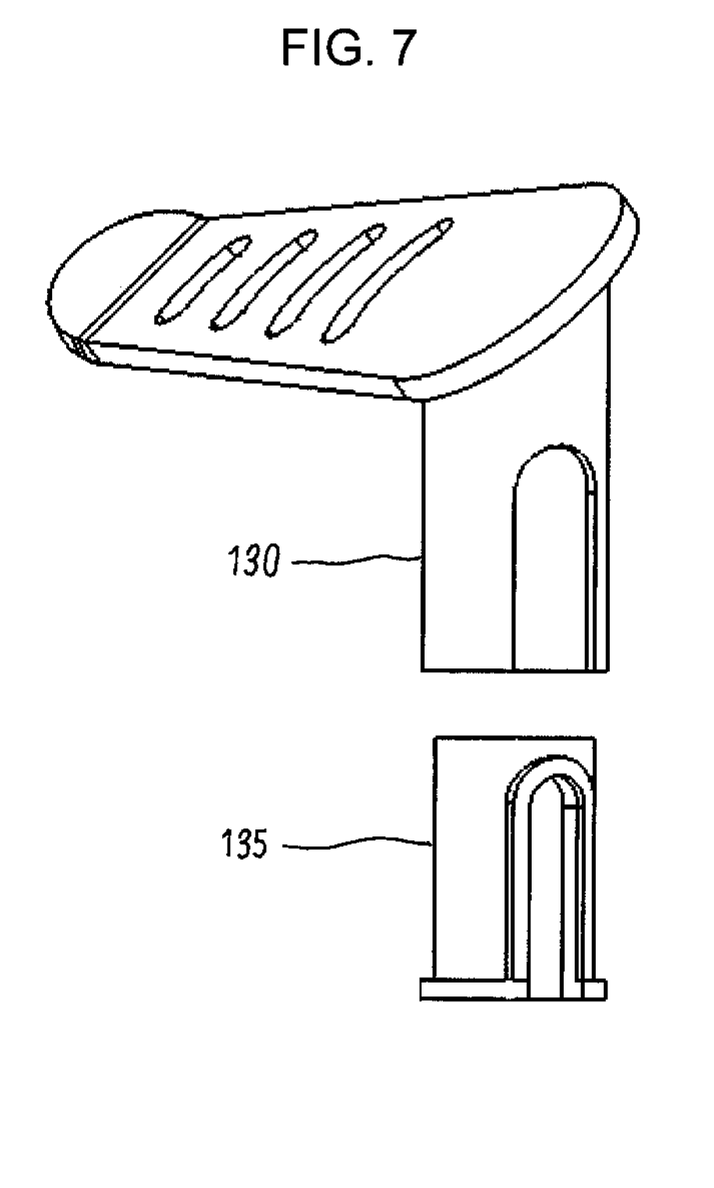
FIG. 7 is an exploded view thereof.

A second embodiment 110 of the motor vehicle accessory is shown in FIGS. 6 and 7. This embodiment differs from the first embodiment in several respects. First, the foot rest portion is metal without a polyurethane coating. Second, the foot rest contains multiple treads 121. Third, the post is omitted. Omitting the post reduces weight and cost, but results in a mounting that is less secure and stable. And fourth, the non-scratching non-metallic surface on the interior of the sleeve is a removable thermoplastic insert 135.

Figure 8:
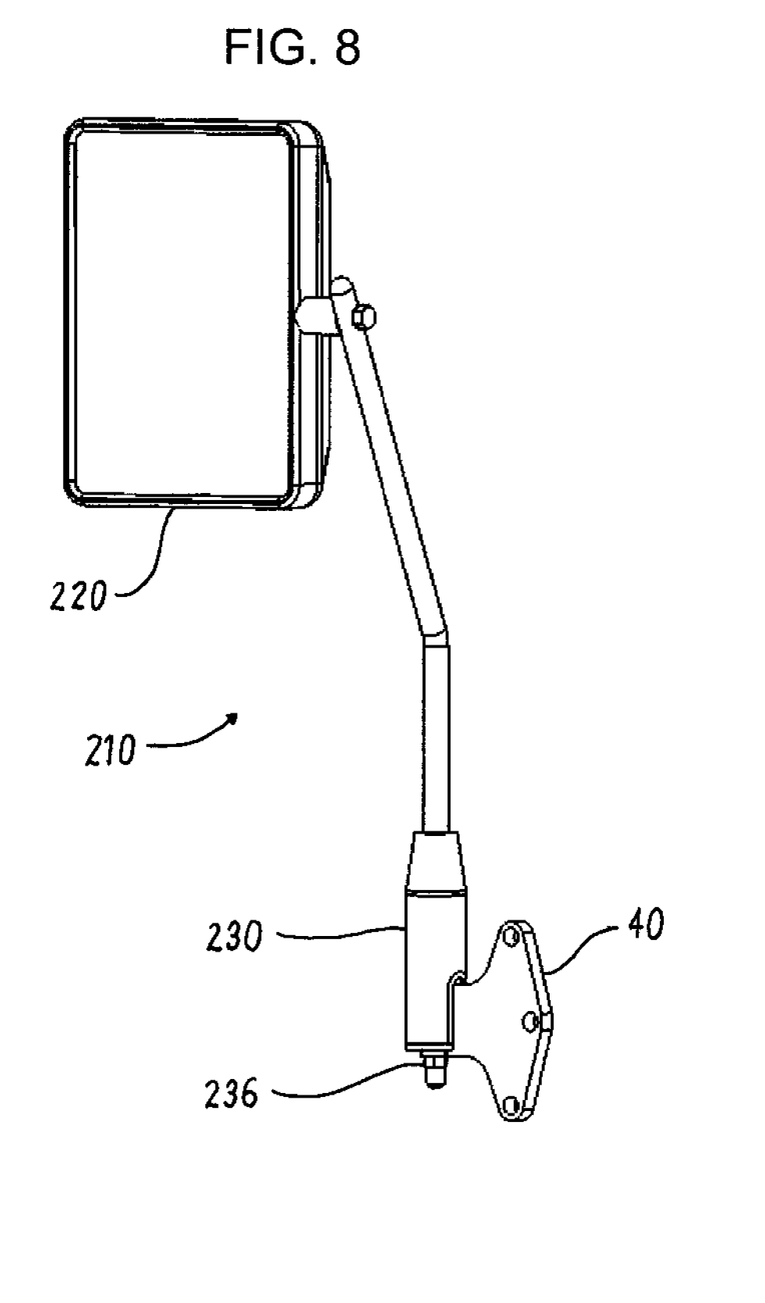
FIG. 8 is a perspective view of a third embodiment of the motor vehicle accessory of the invention.

A third embodiment 210 of the accessory is shown in FIG. 8. This embodiment differs from the first embodiment in several respects. First, the accessory is a mirror 220 rather than a foot rest. Second, the vertical post holding the mirror extends into the sleeve 230 and forms the post. Third, the bottom of the post is threaded so that an optional nut 236 can be attached to provide a more secure attachment to the hinge if desired.

In addition to foot rests and mirrors, other suitable accessories include anchoring points for tents, hammocks, chairs, tables, food preparation grills, flags, and the like.

I claim:

1. An assembly comprising:
(a) a motor vehicle door hinge comprising: (i) a cylindrical sleeve with a vertical axis and an exterior surface; and (ii) a generally rectangular bracket plate attached to and extending vertically along a portion of the exterior surface of the sleeve; and
(b) a foot rest comprising: (i) a metal rod having a horizontal portion forming a foot rest core, a 90 degree bend, and a vertical portion forming a post for insertion into the sleeve of the hinge; (ii) a metal sleeve coaxial with the vertical portion of the rod and having an upper indent and a lower indent, the metal rod being attached in the upper indent and the lower indent straddling the bracket plate of the hinge; (iii) a thermoplastic sleeve within and coaxial with the metal sleeve and spaced apart from the vertical portion of the rod to create an annular space for the cylindrical sleeve of the hinge; and (iv) a thermoplastic cover molded onto the foot rest core.

2. A foot rest for temporary mounting on a motor vehicle door hinge comprising a cylindrical sleeve with a vertical axis and a bracket extending vertically along the sleeve, the foot rest comprising: (a) a metal rod having a horizontal portion forming a foot rest core, a 90 degree bend, and a vertical portion forming a post for insertion into the sleeve of the hinge; (b) a metal sleeve coaxial with the vertical portion of the rod and having an upper indent and a lower indent, the metal rod being attached in the upper indent and the lower indent straddling the bracket of the hinge; (c) a thermoplastic sleeve within and coaxial with the metal sleeve and spaced apart from the vertical portion of the rod to create an annular space for the cylindrical sleeve of the hinge; and (d) a thermoplastic cover molded onto the foot rest core.

* * * * *